(12) United States Patent
Gonzalez Gonzalez et al.

(10) Patent No.: US 12,107,706 B2
(45) Date of Patent: Oct. 1, 2024

(54) METHOD OF ESTIMATING TRANSMIT SYMBOL VECTORS IN AN OVERLOADED COMMUNICATION CHANNEL

(71) Applicant: Continental Automotive GmbH, Hannover (DE)

(72) Inventors: David Gonzalez Gonzalez, Egelsbach (DE); Andreas Andrae, Frankfurt am Main (DE); Osvaldo Gonsa, Frankfurt am Main (DE); Hiroki Iimori, Yokahama (JP); Giuseppe Thadeu Freitas de Abreu, Bremen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/772,781

(22) PCT Filed: Oct. 29, 2019

(86) PCT No.: PCT/EP2019/079532
§ 371 (c)(1),
(2) Date: Apr. 28, 2022

(87) PCT Pub. No.: WO2021/083495
PCT Pub. Date: May 6, 2021

(65) Prior Publication Data
US 2022/0417065 A1    Dec. 29, 2022

(51) Int. Cl.
*H04L 25/03*    (2006.01)
*H04L 5/00*    (2006.01)
*H04L 25/06*    (2006.01)

(52) U.S. Cl.
CPC ...... *H04L 25/03197* (2013.01); *H04L 5/0048* (2013.01); *H04L 25/06* (2013.01)

(58) Field of Classification Search
CPC ................................................ H04L 25/03197
(Continued)

(56) References Cited

U.S. PATENT DOCUMENTS 7,555,064 B2    6/2009    Beadle
8,488,711 B2    7/2013    Huang et al.
(Continued)

FOREIGN PATENT DOCUMENTS

CN    1841987 A    10/2006
CN    102176287 A    9/2011
(Continued)

OTHER PUBLICATIONS

Ryo Hayakawa et al. "Convex Optimization-Based Signal Detection for Massive Overload MIMO Systems", IEEE Transactions on Wireless Communications, vol. 16, No. 11, Nov. 2017, pp. 7080-7091.
(Continued)

*Primary Examiner* — Lihong Yu

(57) ABSTRACT

A computer-implemented method of estimating transmit symbol vectors transmitted in an overloaded communication channel includes receiving a signal represented by a received signal vector, the received signal vector corresponding to a superposition of signals representing transmitted symbols selected from a constellation of symbols and transmitted from one or more transmitters. Continuous first and second functions in a search space in a convex domain are defined. The first function and the second function are combined into a third function, and a fractional programming algorithm is applied to the third function, targeted to finding an input vector that minimizes the third function. A mapping rule translates the found input vector into an estimated transmit symbol vector, and the estimated transmit
(Continued)

symbol vector is output to a decoder for decoding into an estimated transmit symbol from the constellation.

16 Claims, 4 Drawing Sheets

(58) Field of Classification Search
USPC ................................................. 375/262
See application file for complete search history.

(56) References Cited

U.S. PATENT DOCUMENTS

| | | | |
|---|---|---|---|
| 8,699,592 | B1 | 4/2014 | Choi |
| 8,843,096 | B2 | 9/2014 | Becker |
| 9,112,744 | B1 | 8/2015 | Venkatesh |
| 9,312,929 | B2 | 4/2016 | Forenza |
| 9,344,303 | B1 | 5/2016 | Moshavi |
| 10,277,290 | B2 | 4/2019 | Forenza |
| 10,349,417 | B2 | 7/2019 | Forenza |
| 10,425,134 | B2 | 9/2019 | Perlman |
| 2004/0203427 | A1 | 10/2004 | Hill |
| 2006/0227889 | A1 | 10/2006 | Uchida |
| 2007/0127603 | A1 | 6/2007 | Niu |
| 2007/0275727 | A1 | 11/2007 | Lee |
| 2008/0130719 | A1 | 6/2008 | Bottomley |
| 2008/0166975 | A1 | 7/2008 | Kim |
| 2008/0279298 | A1 | 11/2008 | Ben-Yishai |
| 2009/0074050 | A1 | 3/2009 | Wang |
| 2010/0194405 | A1 | 8/2010 | Yu |
| 2011/0222638 | A1 | 9/2011 | Park |
| 2012/0045024 | A1 | 2/2012 | Cui |
| 2012/0045995 | A1 | 2/2012 | Nakano |
| 2013/0201947 | A1 | 8/2013 | Wong |
| 2014/0082459 | A1 | 3/2014 | Li |
| 2015/0326360 | A1 | 11/2015 | Malladi et al. |
| 2016/0315791 | A1 | 10/2016 | Barbu |
| 2017/0102982 | A1 | 4/2017 | Kolandavelu |
| 2017/0346518 | A1 | 11/2017 | Lim |
| 2018/0091261 | A1 | 3/2018 | Sayeed |
| 2018/0102882 | A1 | 4/2018 | Nakamura et al. |
| 2018/0167175 | A1 | 6/2018 | Al-Dweik |
| 2018/0183650 | A1* | 6/2018 | Zhang ............. H04W 72/21 |
| 2018/0227096 | A1 | 8/2018 | Lim et al. |
| 2018/0234948 | A1 | 8/2018 | Ren et al. |
| 2018/0248575 | A1 | 8/2018 | Bardin |
| 2018/0249452 | A1 | 8/2018 | Lee et al. |
| 2018/0278316 | A1 | 9/2018 | Yang |
| 2018/0279270 | A1 | 9/2018 | Sano |
| 2018/0323846 | A1 | 11/2018 | Tsai |
| 2019/0199384 | A1 | 6/2019 | Pekoz |
| 2019/0222281 | A1 | 7/2019 | Sirotkin |
| 2019/0229863 | A1 | 7/2019 | Lei |
| 2019/0245646 | A1 | 8/2019 | Robert Safavi |
| 2020/0014473 | A1 | 1/2020 | Decurninge |
| 2021/0176008 | A1 | 6/2021 | Wang |
| 2022/0417065 | A1 | 12/2022 | Gonzalez Gonzalez |
| 2023/0026867 | A1 | 1/2023 | Gonzalez Gonzalez |
| 2023/0144250 | A1 | 5/2023 | Gonzalez Gonzalez |
| 2023/0171023 | A1 | 6/2023 | Gonzalez Gonzalez |
| 2023/0198811 | A1 | 6/2023 | Gonzalez Gonzalez |

FOREIGN PATENT DOCUMENTS

| | | | |
|---|---|---|---|
| CN | 103119994 | A | 5/2013 |
| CN | 103780293 | A | 5/2014 |
| CN | 104601213 | A | 5/2015 |
| CN | 104796239 | A | 7/2015 |
| CN | 105282060 | A | 1/2016 |
| CN | 106411796 | A | 2/2017 |
| CN | 106712903 | A | 5/2017 |
| CN | 106817334 | A | 6/2017 |
| CN | 107483376 | A | 12/2017 |
| CN | 107566059 | A | 1/2018 |
| CN | 108173575 | A | 6/2018 |
| CN | 109474388 | A | 3/2019 |
| CN | 110071748 | A | 7/2019 |
| CN | 110417515 | A | 11/2019 |
| CN | 114641972 | A | 6/2022 |
| CN | 115336208 | A | 11/2022 |
| CN | 115336209 | A | 11/2022 |
| CN | 115362645 | A | 11/2022 |
| EP | 2830271 | A1 | 1/2015 |
| EP | 3427389 | A1 | 1/2019 |
| EP | 2483730 | B1 | 11/2019 |
| EP | 2909939 | B1 | 3/2021 |
| EP | 3353773 | B1 | 1/2023 |
| JP | 2013522943 | A | 6/2013 |
| JP | 2015056690 | A | 3/2015 |
| JP | 2017521885 | A | 8/2017 |
| KR | 20120125649 | A | 11/2012 |
| KR | 20180091500 | A | 8/2018 |
| KR | 101918584 | B1 | 11/2018 |
| WO | 2010125760 | A1 | 11/2010 |
| WO | 2015186130 | A1 | 12/2015 |
| WO | 2017057655 | A1 | 4/2017 |
| WO | 2017057834 | A1 | 4/2017 |
| WO | 2017071540 | A1 | 5/2017 |
| WO | 2017204469 | A1 | 11/2017 |
| WO | 2018210256 | A1 | 11/2018 |
| WO | 2021083495 | A1 | 5/2021 |
| WO | 2021099622 | A1 | 5/2021 |
| WO | 20210099622 | A1 | 5/2021 |
| WO | 20210198404 | A1 | 10/2021 |
| WO | 20210198406 | A1 | 10/2021 |
| WO | 20210198407 | A1 | 10/2021 |

OTHER PUBLICATIONS

Razvan-Andrei Stoica et al. "Massively Concurrent NOMA: A Frame-Theoretic Design for Non-Orthogonal Multiple Access", Proc. Asilomar Conference on Signals, Systems and Computers, Nov. 2017, pp. 1-6.

Tanumay Datta et al. "Low-Complexity Near-Optimal Signal Detection in Underdetermined Large-MIMO Systems", Proc. NCC, Feb. 2012, pp. 1-5.

Yasser Fadlallah et al. "New Iterative Detector of MIMO Transmission Using Sparse Decomposition", IEEE Transactions on Vehicular Technology, vol. 64, No. 8, Aug. 2015, pp. 3458-3464.

Chen Qian et al. "Two-Stage List Sphere Decoding for Under-Determined Multiple-Input Multiple-Output Systems", IEEE Transactions on Wireless Communications, vol. 12, No. 12, Dec. 2013.

Abdeldjalil Aissa-El-Bey et al. "Sparsity-Based Recovery of Finite Alphabet Solutions to Underdetermined Linear Systems", IEEE, Transactions on Information Theory, vol. 61, Nr. 4; 04. Apr. 2015; pp. 2008-2018.

Patrick L. Combettes et al. "Proximal Splitting Methods in Signal Processing", arXiv:0912.3522v4 [math.OC] May 18, 2010.

Ryo Hayakawa et al. "An Overloaded MIMO Signal Detection Scheme with Slab Decoding and Lattice Reduction", Proceedings of APCC2015 copyright © 2015 IEICE 14 SB 0087, 2015.

Kaiming Shen et al. "Fractional Programming for Communication Systems—Part I: Power Control and Beamforming", IEEE Transactions on Signal Processing, vol. 66, No. 10, May 15, 2018.

Razvan-Andrei Stoica et al. "Frame Theory and Fractional Programming for Sparse Recovery-Based mmWave Channel Estimation", IEEE Access; Band 7, 18 Seiten (150757-150774); XP 11755903A1; Oct. 11, 2019.

International Search Report and Written Opinion dated Jul. 2, 2020 from corresponding International Patent Application No. PCT/EP2019/079532.

M. Adler et al. Autonomous, connected, electric shared vehicles (ACES) and public finance: an explorative analysis [Online]. (2018), Available: https:/papers.tinbergen.nl/19005.pdf.

K. David et al. "6g vision and requirements: Is there any need for beyond 5g?", IEEE veh. Technol. Mag., vol. 13, No. 3. pp. 72-80, Sep. 2018.

E. Baik "Iterative detection for overloaded OFDMA with spatial diversity", Master's thesis, Massachusetts Institute of Technology, Aug. 2006.

(56) References Cited

OTHER PUBLICATIONS

C.S. Park et al. "Carrier aggregation for LTE-advanced: dsign challenges of terminals", IEEE Commun. Mag., vol. 51, No. 12, pp. 76-84, Dec. 2016.
A. Kiayani et al. "Linearity challenges of LTE-advanced mobile transmitters: requirements and potential solutions", IEEE Commun. Mag. vol. 55, No. 6, pp. 170-179, Jun. 2017.
L. Liu et al. "Gaussian message passing for overloaded massive MIMO-NOMA", IEEE Trans. Wireless Commun., vol. (in press), 2018.
C. Bockelmann et al. "Massive machine-type communications in 5G: Physical and MAC-layer solutions", IEEE Commun. Mag., vol. 54, No. 9, pp. 59-65, Sep. 2016.
P. Poposvki et al. "5G wireless networking slicing for eMBB, URLLC, and mMTC: A communication-theoretic view", CoRR vol. abs/1804.05057, 2018 [Online]. Available: http://arxiv.org/abs/1804.05057.
R. Aggarwal et al. "Joint scheduling and resource allocation in the OFDMA downlink: Utility maximization under imperfect channel-state information", IEEE Trans. Signal Process., vol. 59, No. 11, pp. 5589-5604, Nov. 2011.
Z. Ding et al. "A survey on non-orthogonal multiple access for 5G networks: Research challenges and future trends", IEEE J. Sel. Areas Commun., vol. 35, No. 10, pp. 2181-2195, Oct. 2017.
M.S. Ali et al. "Non-orthogonal multiple access (NOMA) for downlink multiuser MIMO systems: User clustering, beamforming, and power allocation", IEEE Access, vol. 5, pp. 565-577, Dec. 2016.
F. Alavi et al. "Beamforming techniques for nonorthogonal multiple access in 5G cellular networks", IEEE Trans. Veh. Technol., vol. 67 No. 10, pp. 9474-9487, Oct. 2018.
S. Stanzak et al. "On pilot-based multipath channel estimation for uplink CDMA systems: An overloaded case", IEEE Trans. Signal Process., vol. 54, No. 2. pp. 512-519, Feb. 2006.
F. Alavi et al "Robust beamforming techniques for non-orthogonal multiple access systems with bounded channel uncertainties", IEEE Commun. Letters, vol. 21, No. 9, pp. 2033-2036, Sep. 2017.
R.A. Stoica et al. "Massively concurrent non-orthogonal multiple access for 5G networks and beyond", Submitted to IEEE Trans. Wireless Commun., 2019.
C. Rusu et al. "Algorithms for the construction of incoherent frames under various design constraints", arXiv: 1801.09678, 2018.
R.A. Stoica et al. "A frame-theoretic scheme for robust millimeter wave channel estimation" in Proc. IEEE VTC Fall, Chicago, USA, Aug. 2018, pp. 1-6.
T. Hara et al. "On the sum-rate capacity and spectral efficiency gains of massively concurrent NOMA systems", in Proc. IEEE WCNC, Marrakech, Morocco, Apr. 2019, pp. 1-6.
Y. Du et al. "Joint channel estimation and multiuser detection for uplink grant-free noma", IEEE Wireless Commun. Letters, vol. 7, No. 4, pp. 682-685, Aug. 2018.
H.V. Cheng et al. "Performance analysis of noma in training-based multiuser mimo systems", IEEE Trans. Wireless Commun., vol. 17, No. 1, pp. 372-385, Jan. 2018.
Z. Yang et al. "On the performance of non-orthogonal multiple access systems with partial channel information", in IEEE Trans. Commun., vol. 64, No. 2, 2018, pp. 654-667.
H. Limori et al. "Fractional programming for robust TX BF design in multi-user/single-carrier PD-NOMA", in Proc. IEEE WiOpt, Avignon, France, 2019, pp. 1-7.
M. Nagahara "Discrete signal reconstruction by sum of absolute values", IEEE Signal Process. Lett., vol. 22, No. 10, pp. 1575-1579, Oct. 2015.
M. Medra et al. "Using fractional programming for zero-norm approximation", arXiv:1810.11725, Oct. 2018.
P.L. Combettes et al. "Proximal splitting methods in signal processing", Fixed-point algorithms for inverse problems in science and engineering, pp. 185-212, 2011.
Non-Final Office Action dated Apr. 27, 2023 from related U.S. Appl. No. 17/916,640.

Office Action dated Aug. 31, 2023 from related Chinese patent application No. 202180025535.2.
Office Action dated Aug. 31, 2023 from related Korean patent application No. 10-2022-7033311.
Masaaki Nagahara / Discrete Signal Reconstruction by Sum of Absolute Values. Mar. 20, 2015.
G.D. Golden, C.J. Foschini, R.A. Valenzuela and P.W. Wolniansky / Detection algorithm and initial laboratory results using V-BLAST space-time communication architecture. Mar. 19, 2020.
Stephen Boyd, Lieven Vandenberghe / Convex Optimization. (Chapter 3 Convex Functions) Mar. 2004.
Tanumay Datta et al. / Low-Complexity Near-Optimal Signal Detection in Underdetermined Large-MIMO Systems. Feb. 5, 2012—in Proc. NCC, pp. 1-5.
Hiroki Iimori et al. / Discreteness-aware Receivers for Overloaded MIMO Systems. Jan. 21, 2020, Submitted to IEEE TWC.
Ryo Hayakawa et al. / Convex Optimization-Based Signal Detection for Massive Overloaded MIMO Systems. Nov. 9, 2017—IEEE Trans. Wireless Commun., vol. 16, No. 11, pp. 7080-7091.
Hiroki Iimori et al. / Joint Detection in Massive Overloaded Wireless System via Mixed-Norm Discrete Vector Decoding. Nov. 6, 2019—in Proc. Asilomar CSSC, Pacific Grove, USA.
Kai-Kit Wong, Arogyaswami Paulraj and Ross D. Murch / Efficient High-Performance Decoding for Overloaded MIMO Antenna Systems. May 21, 2007—vol. 6, No. 5, pp. 1833-1843.
G. E. Prescott, J. L. Hammond, D. R. Hertling / Adaptive Estimation of Transmission Distortion in a Digital Communications Channel. Sep. 9, 1988.
Tianbin WO and Peter Adam Hoeher / A Simple Iterative Gaussian Detector for Severely Delay-Spread MIMO Channels. Jun. 28, 2007.
Zahran Hajji, Abdeldjalil Aissa-El-Bey, Karine Amis / Simplicity-based recovery of finite-alphabet signals for large-scale MIMO systems. Jun. 9, 2018.
Yasser Fadlallah et al. / New Iterative Detector of MIMO Transmission Using Sparse Decomposition. Sep. 29, 2014—IEEE Transactions on Vehicular Technology, vol. 64, No. 8, pp. 3458-3464.
Hiroki Iimori, Guiseppe Thadeu Freitas De Abreu, George C. Alexa / MIMO Beamforming Schemes for Hybrid SIC FD Radios With Imperfect Hardware and CSI. Oct. 9, 2019.
Hwanjin Kim and Junil Choi / Channel Estimation for Spatially/Temporally Correlated Massive MIMO Systems with One-Bit ADCs. Dec. 9, 2019.
Mahdi Barzegar Khalilsarai, Saeid Haghighatshoar et al. / FDD Massive MIMO via UL/DL Channel Covariance Extrapolation and Active Channel Sparsication. Jan. 1, 2019.
De Mi, Mehrdad Dianati, Lei Zhang, Sami Muhaidat, Rahim Tafazolli / Massive MIMO Performance With Imperfect Channel Reciprocity and Channel Estimation Error. Sep. 1, 2017.
D. Saffar, N. Boulejfen, F. Ghannouchi, M. Helaoui, A. Gharss / Behavioral Modeling of MIMO Transmitters Exhibiting Nonlinear Distortion and Hardware Impairements. Oct. 10, 2011.
Deng et al. "Performance analysis of relaying networks based on non-orthogonal multiple access", Journal of University of Science and Technology of China, vol. 49, No. 7, Jul. 2019.
Wu et al. "Efficient Channel Estimation for mmWave MIMO with Transceiver Hardware Impairments", pp. 1-13, IEEE, 2019.
Jiang Xiaolin, "Multiuser Detection Algorithm in the Direction of Noise Enhanced Subspace in Massive MIMO Systems", 2015 10th International Conference on Communications and Networking in China (ChinaCom), Date of Conference: Aug. 15-17, 2015, DOI: 10.1109/CHINACOM.2015.7497968 and translation of same.
Hiroki Limori et al., "Robust Transmit Beamforming Design via Fractional Programming for Downloads Power Domain Noma Systems", IEICE Technical Report, IEEE, Jul. 3, 2019, vol. 119, No. 106, pp. 27-32 and translation of same.
Razvan-Andrei Stoica et al., "Massively Concurrent NOMA: A Frame-Theoretic Design for Non-Orthogonal Multiple Access", 2018 52nd Asilomar Conference on Signals, Systems, and Computers, Date of Conference: Oct. 28-31, 2018, DOI: 10.1109/ACSSC.2018.8645146.

(56) References Cited

OTHER PUBLICATIONS

Mohamad A Suliman et al., "SNR Estimation in Linear Systems with Gaussian Matrices", IEEE Signal Processing Letters (vol. 24, Issue: 12, Dec. 2017), pp. 1867-1871, DOI: 10.1109/LSP.2017.2757398.

Limori Hiroki et al., "Design of Discretness-Aware Linear MMSE Filter", The 42nd Symposium on Information Theory and its Applications (SITA2019) and translation of same.

Razan-Andrei Stoica et al., "Sparsely-structured Multiuser Detection for Large Massively Concurrent NOMA Systems", 2019 53rd Asilomar Conference on Signals, Systems, and Computers, Date of Conference: Nov. 3-6, 2019, DOI: 10.1109/IEEECONF44664.2019.9048777.

Razan-Andrei Stoica et al., "A low-complexity Receiver for Massively Concurrent Non-orthogonal Multiple Access", 2019 IEEE 20th International Workshop on Signal Processing Advances in Wireless Communications (SPAWC), Date of Conference: Jul. 2-5, 2019, DOI: 10.1109/SPAWC.2019.8815592.

Takumi Takahashi et al., "Channel Estimation Using Long-term Channel Statistics for BP-based Large MIMO Detection", 2019, IEICE Technical Report, vol. 119, No. 8, pp. 76-72 and translation of same.

Charles Jeon, "Data Detection in Massive Mu-Mimo Systems", May 2019, Presented to the Faculty of the Graduate School of Cornell University in Partial Fulfillment of the Requirements for the Degree of Doctor of Philosophy.

Gang Yang, "A novel Ultra-wideband weighted ATR receiver based on MMSE estimation for localization applications", 2011 IEEE International Conference on Cyber Technology in Automation, Control, and Intelligent Systems, Date of Conference: Mar. 20-23, 2011, DOI: 10.1109/CYBER.2011.6011765.

Zhang Mei, "Research on sparse multiuser detection strategy in Non-Orthogonal multiple access system" Electronic and Communication Engineering Industrial Technology Research Institute, May 2019 and translation of same.

Zhao Xiaojuan et al., "Multi-user detection in NOMA system based on structured compressed sensing", and translation of same.

R Hayakawa et al., "An overloaded MIMO signal detection scheme with slab decoding and lattice reduction", 2015 21st Asia-Pacific Conference on Communications (APCC), Date of Conference: Oct. 14-16, 2015, DOI: 10.1109/APCC.2015.7412549.

Qian Cheng et al., "Resource Allocation for Device-to-device Aided Cooperative NOMA with Imperfect CSI", 2019 26th International Conference on Telecommunications (ICT), Date of Conference: Apr. 8-10, 2019, DOI: 10.1109/ICT.2019.8798839.

Zhang Xianyu et al., "Ultra Wide-Band Channel Estimation and Signal Detection Through Compressed Sensing", China Academic Journal Electronic Publishing House, Feb. 2010, vol. 44 No. 2 and translation of same.

Tanumay Datta et al., "Low-Complexity Near-Optimal Signal Detection in Underdetermined Large-MIMO Systems", 2012 National Conference on Communications (NCC), Date of Conference: Feb. 3-5, 2012, DOI: 10.1109/NCC.2012.6176823.

U.S. Appl. No. 17/916,640, filed Oct. 3, 2022, including Non-Final Office Action dated Mar. 27, 2023 and Notice of Allowance dated Jan. 4, 2024.

U.S. Appl. No. 17/916,672, filed Oct. 3, 2022, including Non-Final Office Action dated Dec. 20, 2023.

Chinese Office Action dated May 31, 2024 for the counterpart Chinese Patent Application No. 201980101725.0 and machine translation of same.

Ryo Hayakawa et al., "Convex Optimization-Based Signal Detection for Massive Overload MIMO Systems", IEEE Transactions on Wireless Communications, vol. 16, no. 11, pp. 7080-7091, 2017. Cited in NPL Cite No. 1.

Jin et al., "Resolution and Reconstruction of an Algorithm by a Modified Mobius Transformation in Signal. Processing", 2009 Fifth International Joint Conference on Inc, IMS and IDC, Date of Conference: Aug. 25-27, 2009, Date of Conference: Aug. 25-27, 2009, DOI: 10.1109/NCM.2009.317 cited in U.S. Appl. No. 17/778,703 Non-Final Office Action dated Jul. 25, 2024.

* cited by examiner

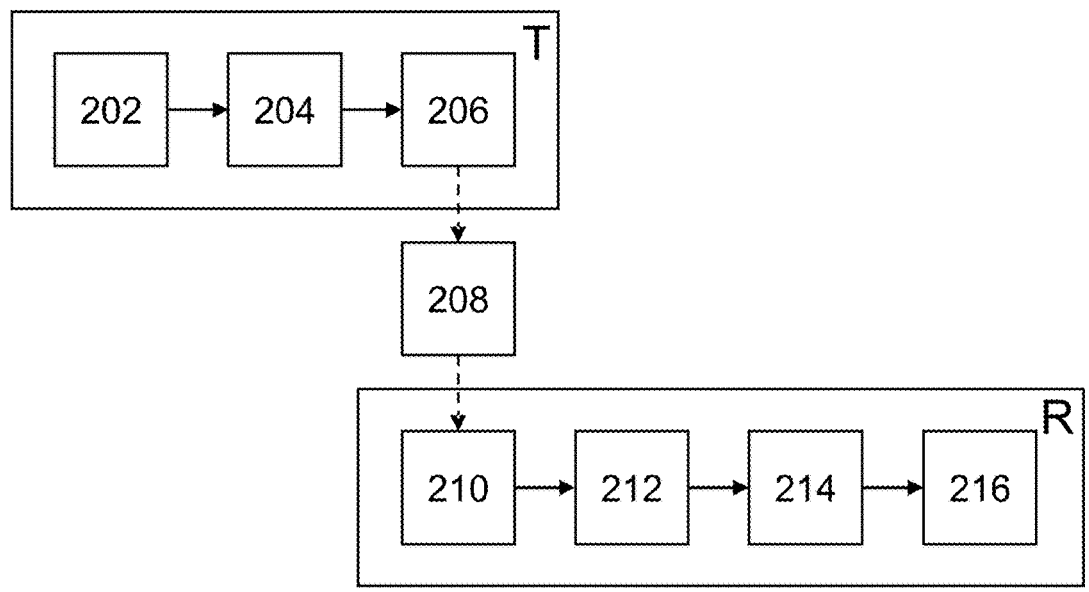
Fig. 3
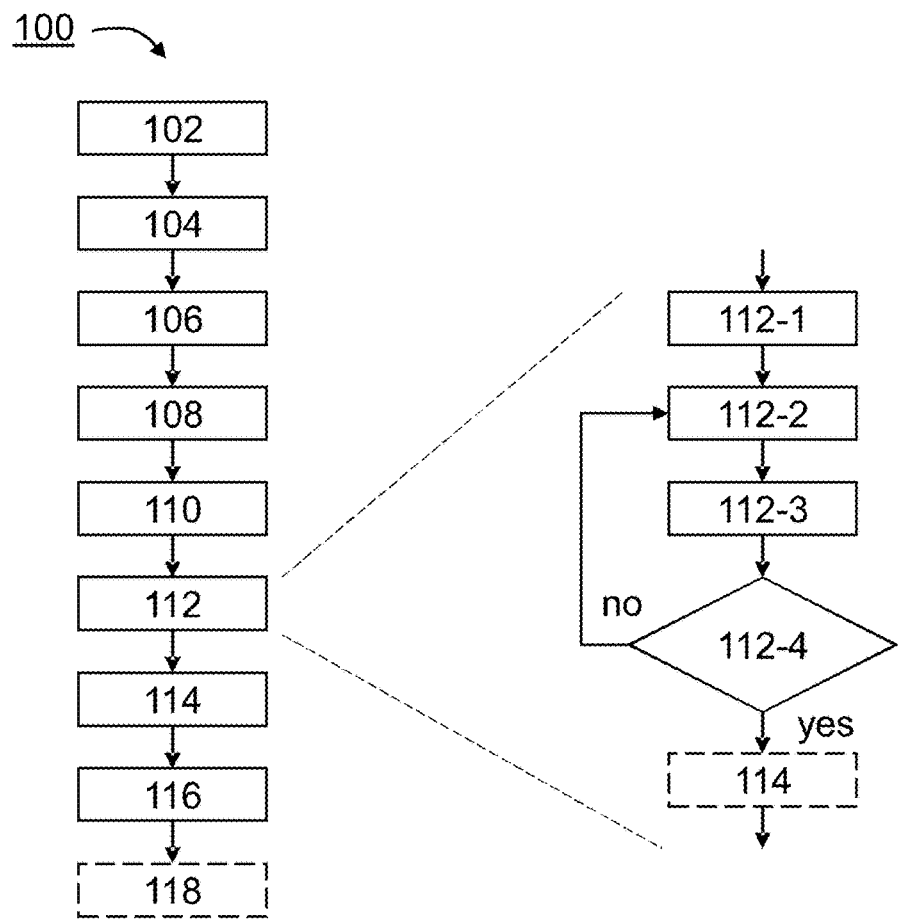
Fig. 4
Fig. 5

METHOD OF ESTIMATING TRANSMIT SYMBOL VECTORS IN AN OVERLOADED COMMUNICATION CHANNEL

BACKGROUND

The present invention relates to the field of digital communications in overloaded channels.

It is estimated that by 2030, over 100 billion wireless devices will be interconnected through emerging networks and paradigms such as the Internet of Things (IoT), fifth generation (5G) cellular radio, and its successors. This future panorama implies a remarkable increase in device density, with a consequent surge in competition for resources. Therefore, unlike the preceding third generation (3G) and fourth generation (4G) systems, in which spreading code overloading and carrier aggregation (CA) were add-on features aiming at moderately increasing user or channel capacity, future wireless systems will be characterized by nonorthogonal access with significant resource overloading.

The expressions "resource overloading" or "overloaded communication channel" typically refers to a communication channel that is concurrently used by a number of users, or transmitters, T whose number $N_T$ is larger than the number $N_R$ of resources R. At a receiver the multiplicity of transmitted signals will appear as one superimposed signal. The channel may also be overloaded by a single transmitter that transmits a superposition of symbols and thereby goes beyond the available channel resources in a "traditional" orthogonal transmission scheme. The "overloading" thus occurs in comparison to schemes, in which a single transmitter has exclusive access to the channel, e.g., during a time slot or the like, as found in orthogonal transmission schemes. Overloaded channels may be found, e.g., in wireless communication systems using Non-Orthogonal Multiple Access (NOMA) and underdetermined Multiple-Input Multiple-Output (MIMO) channels.

FIGS. 1 and 2 illustrate basic properties of orthogonal multiple access and non-orthogonal multiple access, respectively. FIG. 1 shows one exemplary embodiment of the ordered access of transmit resources to channels of a shared transmission medium, e.g., in a wireless communication system. The available frequency band is split into a number of channels. A single channel or a combination of contiguous or non-contiguous channels may be used by any one transmitter at a time. Different transmitters, indicated by the different hashing patterns, may transmit in discrete time slots or in a number of subsequent timeslots and may change the channels or combination of channels in which they transmit for each transmission. Note that, as shown in FIG. 1, any transmitter may use one channel resource over a longer period of time, while another transmitter may use two or more channel resources simultaneously, and yet another transmitter may to both, using two or more channel resources over a longer period of time. In any case, only one transmitter uses any channel resource or combination thereof at a time, and it is relatively easy to detect and decode signals from each transmitter.

FIG. 2a shows the same frequency band as shown in FIG. 1, but there may not always be a temporary exclusive assignment of one or more individual channels to a transmitter. Rather, at least a portion of the frequency band may concurrently be used by a plurality of transmitters, and it is much more difficult to detect and decode signals from individual transmitters. Again, different hashing patterns indicate different transmitters, and the circled portions indicate where wo or more transmitters concurrently use a resource. While, beginning from the left, at first three transmitters use temporary exclusive channel resources in an orthogonal manner, in the next moment two transmitters transmit in channels that partially overlap. The transmitter represented by the horizontal hashing pattern has exclusive access to the channel shown at the bottom of the figure, while the next three channels used by this transmitter are also used by another transmitter, represented by diagonal hashing pattern in the dashed-line oval. The superposition is indicated by the diagonally crossed hashing pattern. A similar situation occurs in the following moment, where each of two transmitters exclusively uses two channel resources, while both share a third one. It is to be noted that more than two transmitters may at least temporarily share some or all of the channel resources each of them uses. These situations may be called partial-overloading, or partial-NOMA.

In a different representation, FIG. 2b shows the same frequency band as FIG. 2a. Since there is no clear temporary exclusive assignment of one or more individual channels to a transmitter, and at least a portion of the frequency band is at least temporarily concurrently used by a plurality of transmitters, the difficulty to detect and decode signals from individual transmitters is indicated by the grey filling pattern that does not allow for identifying any single transmitter. In other words, all transmitters use all channels.

Signals from some transmitters may be transmitted using higher power than others and may consequently be received with a higher signal amplitude, but this may depend on the distance between transmitter and receiver. FIGS. 2a and 2b may help understanding the situation found in non-orthogonal multiple access environments.

One of the main challenges of such overloaded systems is detection at the receiver, since the bit error rate (BER) performances of well-known linear detection methods, such as zero-forcing (ZF) and minimum mean square error (MMSE), are far below that of maximum likelihood (ML) detection, which is a preferred choice for detecting signals in overloaded communication channels. ML detection methods determine the Euclidian distances, for each transmitter, between the received signal vector and signal vectors corresponding to each of the symbols from a predetermined set of symbols that might have been transmitted, and thus allow for estimating transmitted symbols under such challenging conditions. The symbol whose vector has the smallest distance to the received signal's vector is selected as estimated transmitted symbol. It is obvious, however, that ML detection does not scale very well with larger sets of symbols and larger numbers of transmitters, since the number of calculations that need to be performed for large sets in a discrete domain increases exponentially.

In order to circumvent this issue, several signal detection methods based on sphere decoding have been proposed in the past, e.g. by C. Qian, J. Wu, Y. R. Zheng, and Z. Wang in *"Two-stage list sphere decoding for under-determined multiple-input multiple-output systems,"* IEEE Transactions on Wireless Communication, vol. 12, no. 12, pp. 6476-6487, 2013 and by R. Hayakawa, K. Hayashi, and M. Kaneko in *"An overloaded MIMO signal detection scheme with slab decoding and lattice reduction,"* Proceedings APCC, Kyoto, Japan, October 2015, pp. 1-5, which illustrate its capability of asymptotically reaching the performance of ML detection at lower complexity. However, the complexity of the known methods grows exponentially with the size of transmit signal dimensions, i.e., the number of users, thus preventing application to large-scale systems.

R. Hayakawa and K. Hayashi, in "*Convex optimization-based signal detection for massive overloaded MIMO systems,*" IEEE Transactions on Wireless Communication, vol. 16, no. 11, pp. 7080-7091, November 2017, propose a low-complexity signal detector for large overloaded MIMO systems for addressing the scalability issue found in the previous solutions. This low complexity signal detector is referred to as sum-of-absolute-value (SOAV) receiver, which relies on a combination of two different approaches: a) the regularization-based method proposed by A. Aïssa-El-Bey, D. Pastor, S. M. A. Sbaï, and Y. Fadlallah in "*Sparsity-based recovery of finite alphabet solutions of underdetermined linear system,*" IEEE Transactions on Information Theory, vol. 61, no. 4, pp. 2008-2018, 2015, and b) the proximal splitting method described by P. L. Combettes and J.-C. Pesquet in "*Proximal splitting methods in signal processing,*" Fixed-point algorithms for inverse problems in science and engineering, pp. 185-212, 2011.

While the SOAV decoder was found to outperform other state-of-the-art schemes, in terms of superior BER performance with significantly lower complexity, a shortfall of SOAV is that the $l_0$-norm regularization function employed to capture the discreteness of input signals is replaced by an $l_1$-norm approximation, leaving potential for further improvement.

It is, thus, an object of the present invention to provide an improved method for estimating transmit symbol vectors, particularly in overloaded communication channels.

BRIEF SUMMARY

The inventors recognize that, since the symbols used in digital communications are ultimately transmitted as analogue signals in the analogue, i.e., continuous domain, and attenuation, intermodulation, distortion and all kinds of errors are unavoidably modifying the signals on their way from the transmitter through the analogue communication channel to the receiver, the "detection" of the transmitted symbol in the receiver remains foremost an "estimation" of the transmitted signal, irrespective of the method used and, as the signals are in most if not all cases represented by signal amplitude and signal phase, in particular to the estimation of the transmitted signal's vector. However, in the context of the present specification the terms "detecting" and "estimating" are used interchangeably, unless a distinction therebetween is indicated by the respective context. Once an estimated transmitted signal's vector is determined it is translated into an estimated transmitted symbol, and ultimately provided to a decoder that maps the estimated transmitted symbol to transmitted data.

In the context of the present specification and claims, a communication channel is characterized by a set or matrix of complex coefficients. The channel matrix may also be referred to by the capital letter H. The communication channel may be established in any suitable medium, e.g., a medium that carries electromagnetic, acoustic and/or light waves. It is assumed that the channel properties are perfectly known and constant during each transmission of a symbol, i.e., while the channel properties may vary over time, each symbol's transmission experiences a constant channel.

The expression "symbol" refers to a member of a set of discrete symbols which form a constellation C of symbols or, more profane, an alphabet that is used for composing a transmission. A symbol represents one or more bits of data and represents the minimum amount of information that can be transmitted at a time in the system using constellation C. In the transmission channel a symbol may be represented by a combination of analogue states, e.g., an amplitude and a phase of a carrier wave. Amplitude and phase may, e.g., be referred to as a complex number or as ordinate values over an abscissa in the cartesian space, and may be treated as a vector. A vector whose elements are symbols taken from C is referred herein by the small letter s. Each transmitter may use the same constellation C for transmitting data. However, it is likewise possible that the transmitters use different constellations. It is assumed that the receiver has knowledge about the constellations used in the respective transmitters.

A convex domain is a domain in which any two points can be connected by a straight line that entirely stays within the domain, i.e., any point on the straight line is a point in the convex domain. The convex domain may have any dimensionality, and the inventors recognize that the idea of a straight line in a 4-or-more-dimensional domain may be difficult to visualise.

The terms "component" or "element" may be used synonymously throughout the following specification, notably when referring to vectors.

As was mentioned before, in typical ML detection schemes one constraint is the strong focus on the discrete signal vectors for symbols $c_i$ of the constellation C, which prevents using, e.g., known-effective fractional programming (FP) algorithms for finding the signal vector and thus the symbol having the minimum distance to the received signal's vector. The strong focus is often expressed through performing individual calculations for symbols of the constellation C in equations describing the detection. Some schemes try to enable the use of FP algorithms for estimating the most likely transmitted symbol and replace the individual calculations for symbols by describing the discreteness of the constellation C through a $l_1$-norm that is continuous and can thus be subjected to FP algorithms for finding minima. However, using the $l_1$-norm introduces a fair amount of estimation errors, which is generally undesired.

The detection scheme for overloaded systems of the method presented herein does not rely on the loose relaxation of the $l_0$-norm by resorting to a $l_1$-norm. Rather, in the inventive method a function $f_2$ that is a tight $l_0$-norm approximation is employed, which allows utilizing an efficient and robust FP framework for the optimization of non-convex fractional objectives, which is less computationally demanding, and shown via simulations to outperform SOAV.

In the following, the theoretical base of the inventive detection scheme will be explained with reference to an exemplary underdetermined wireless system with $N_T$ transmitters and $N_R < N_T$ receive resources, such that the overloading ratio of the system is given by $\gamma = N_T/N_R$ and the received signal, after well-known signal realization, can be modelled as $$y = Hs + n, \text{ where } H \triangleq \begin{bmatrix} \text{Re}\{H\} & -\text{Im}\{H\} \\ \text{Im}\{H\} & \text{Re}\{H\} \end{bmatrix}, \quad (1)$$

$$s \triangleq \begin{bmatrix} \text{Re}\{s\} \\ \text{Im}\{s\} \end{bmatrix}, n \triangleq \begin{bmatrix} \text{Re}\{n\} \\ \text{Im}\{n\} \end{bmatrix}, s = [s_1, \ldots s_T]^T \in \mathbb{C}^{T \times 1} \text{ is}$$

a transmit symbol vector with each element sampled from a constellation set C of cardinality $2^b$, with b denoting the number of bits per symbol, $n \in \mathbb{C}^{N_R \times 1}$ is a circular symmetric complex additive white Gaussian noise (AWGN) vector with zero mean and covariance matrix $\sigma_n^2 I_{N_R}$, and $H \in$ $\mathbb{C}^{N_R \times N_T}$ describes a flat fading channel matrix between the transmitter and receiver sides.

In conventional detectors a maximum likelihood (ML) detection may be used for estimating a transmit signal vector $s^{ML}$ for a received signal y. The ML detection requires determining the distances between the received signal vector y and each of the symbol vectors s of the symbols $c_i$ of the constellation C. The number of calculations exponentially increases with the number $N_T$ of transmitters T.

The discreteness of the target set to the ML function prevents using effective FP algorithms, which are known to be effective for finding minima in functions having continuous input, for estimating the transmit signal vector ŝ for a received signal y.

In accordance with the present invention the discrete target set for the ML function is first transformed into a sufficiently similar continuous function, which is open to solving through FP algorithms.

To this end, the alternative representation of the discrete ML function
s.t.

$$\sum_{i=1}^{2^{\frac{b}{2}}} \|s - c_i 1\|_0 = T \cdot \left(2^{\frac{b}{2}} - 1\right) \quad (2b)$$

is first transformed into a penalized mixed $l_0$-$l_2$ minimization problem that retains ML-like performance for the approximation of the constraint:

$$\tilde{s}^{ML} = \underset{s \in \mathbb{R}^{2T}}{\operatorname{argmin}} \sum_{i=1}^{2^{b/2}} w_i \|s - c_i 1\|_0 + \lambda \|y - Hs\|_2^2 \quad (3)$$

where w and $\lambda$ are weighting parameters. The notation $\tilde{s}^{ML}$ indicates that the approximation still has the potential to achieve near-ML performance, as long as the weights w and $\lambda$ are properly optimized. T is the number of transmitters and may also be referred to by $N_T$.

In order to address the intractable non-convexity of the $l_0$-norm without resorting to the $l_1$-norm, the $l_0$-norm is replaced with the asymptotically tight expression:

$$\|x\|_0 = \lim_{a \to 0+} \sum_{j=1}^{T} \frac{|x_j|}{|x_j| + \alpha} = T - \lim_{a \to 0+} \sum_{j=1}^{T} \frac{\alpha}{|x_j| + \alpha}. \quad (4)$$

where x is an arbitrary sparse vector of length T.

The tight approximation of the $l_o$-norm is then used as a substitute of the $l_0$-norm in the penalized mixed $l_0$-$l_2$ minimization problem, and a slack variable $t_{ij}$ with the constraint $|s_j - c_i| \le t_{ij}$ is introduced, yielding $$\tilde{s} = \underset{\substack{s \in \mathbb{R}^{2T}; \\ t \in \mathbb{R}^{2^{\frac{b}{2}}T}}}{\operatorname{argmin}} - \sum_{i=1}^{2^{\frac{b}{2}}} w_i \sum_{j=1}^{T} \frac{\alpha}{t_{ij} + \alpha} + \lambda \|y - Hs\|_2^2 \quad (5a)$$

$$\text{s.t. } |s_j - c_i| \le t_{ij} \quad (5b)$$

with now $\alpha \ll 1$.

Since the ratios $$\frac{\alpha}{t_{ij} + \alpha}$$

in equation (5a) possess a concave-over-convex structure due to the convex non-negative nominator and concave (linear) positive denominator, the required condition for convergence of the quadratic transform (QT) is satisfied, as has been shown by K. Shen and W. Yu in "Fractional programming for communication systems—Part I: Power control and beamforming," IEEE Trans. Signal Process., vol. 66, no. 10, pp. 2616-2630 May 2018, such that equation (5a) can be reformulated into the following convex problem:

$$\tilde{s} = \underset{\substack{s \in \mathbb{R}^{2T}; \\ t \in \mathbb{R}^{2^{\frac{b}{2}}T}}}{\operatorname{argmin}} - \sum_{i=1}^{2^{\frac{b}{2}}} w_i \sum_{j=1}^{T} \beta_{ij}^2 t_{ij} + \lambda \|y - Hs\|_2^2 \quad (6a)$$

$$\text{s.t. } |s_j - c_i| \le t_{ij} \quad (6b)$$

$$\text{where } \beta_{ij} \triangleq \frac{\sqrt{\alpha}}{t_{ij} + \alpha}.$$

Thanks to the convergence of $\beta_{ij}$ the equation can be solved through FP by iteratively updating $\beta_{ij}$ and solving the equation for a given $\beta_{ij}$. The equation obtained by transforming the initial non-convex optimization problem into a convex optimization problem can be efficiently solved using known algorithms, such as augmented Lagrangian methods.

Thus, a computer-implemented method in accordance with the present invention of estimating transmit symbol vectors ŝ transmitted in an overloaded communication channel that is characterized by a channel matrix H of complex coefficients includes receiving, in a receiver R, a signal represented by a received signal vector y. The received signal vector y corresponds to a superposition of signals representing transmitted symbol vectors s selected from a constellation C of symbols $c_i$ that are transmitted from one or more transmitters T, plus any distortion and noise added by the channel.

In case of more than one transmitter the transmitters T are temporally synchronized, i.e., a common time base is assumed between the transmitters T and the receiver R, such that the receiver R receives transmissions of symbols from different transmitters T substantially simultaneously, e.g., within a predetermined time window. The symbols being received simultaneously or within a predetermined time window means that all temporally synchronized transmitted symbols are received at the receiver R before subsequent symbols are received, assuming that a transmitter T transmits a sequence of symbols one by one. This may include settings in which transmitters T adjust the start time of their transmission such that a propagation delay, which depends on the distance between transmitter T and receiver R, is compensated for. This may also include that a time gap is provided between transmitting subsequent symbols.

The method further comprises defining a convex search space including at least the components of the received signal vector y and of the transmit symbol vectors s for all symbols $c_i$ of the constellation C. Further, continuous first and second functions $f_1$ and $f_2$ are defined in the search space. In this context, defining may include selecting factors or ranges of variables or the like for or in an otherwise predetermined function.

The continuous first function $f_1$ is a function of the received signal vector y and the channel characteristics H and has a global minimum where the product of an input vector s from the search space and the channel matrix H equals the received signal vector y.

The continuous second function $f_2$ is a function of input vectors s from the search space and has a significant low value for each of the transmit symbol vectors s of the symbols $c_i$ of the constellation C.

In accordance with the invention the first function $f_1$ and the second function $f_2$ are combined into a third function $f_3$ by weighted adding, and a fractional programming algorithm FP is applied to the third function $f_3$, targeted to finding an input vector ŝ that minimizes the third function $f_3$. In other words, ŝ is the optimal solution or outcome of applying the FP algorithm to the third function $f_3$ for which the third function $f_3$ has a minimum.

Once an input vector ŝ that minimizes the third function $f_3$ is found, a mapping rule is applied thereto that translates the input vector ŝ into an estimated transmit vector ŝc, in which the index "C" indicates that every single component belongs to the constellation C. In other words, if the vector has two components, A and B, each of the components A and B of the input vector ŝ that minimizes the third function $f_3$ can have any value in the search space. These values are translated into values A' and B' of the estimated transmit vector ŝc, each of which can only have a value that occurs in any one of the transmit symbol vectors s for the symbols $c_i$ of the constellation C. The components may be mapped separately, e.g., by selecting the closest value of a corresponding component of any of transmit symbol vectors s of the symbols $c_i$ of the constellation C.

After the mapping the estimated transmit symbol vector ŝc is output to a decoder to obtain the data bits of the transmitted message.

In one or more embodiments the second function $f_2$ has a tuneable factor that determines the gradient of the function in the vicinity of the significant low value at each of the vectors of the symbols of the constellation. The tuneable factor may help the FP algorithm to converge faster and/or to skip local minima that may be farther away from an optimal or at least better solution.

In some embodiments the tuneable factor may be different for different symbols of the constellation. For example, the gradient in the vicinity of a vector for a symbol that is farther away from the global minimum of the first function $f_1$ may be very steep, but may be so only very close to the significant low value. Depending on the FP algorithm and the start value used this may help skipping local minima located at a greater distance from the global minimum of the first function $f_1$. On the other hand, the gradient in the vicinity of a vector for a symbol that is located close to the global minimum of the first function $f_1$ may be rather shallow at a certain distance to the significant low value and growing steeper as the distance shrinks. Depending on the FP algorithm used this may help the function to quickly converge to a significant low value.

In some embodiments the first function $f_1$ is monotonously increasing from the global minimum. The first function may be considered a coarse guidance function for the FP algorithm, which helps the FP algorithm to converge. It is, thus, advantageous if the first function itself does not have any local minima.

A receiver of a communication system has a processor, volatile and/or non-volatile memory and at least one interface adapted to receive a signal in a communication channel. The non-volatile memory may store computer program instructions which, when executed by the microprocessor, configure the receiver to implement one or more embodiments of the method in accordance with the invention. The volatile memory may store parameters and other data during operation. The processor may be called one of a controller, a microcontroller, a microprocessor, a microcomputer and the like. And, the processor may be implemented using hardware, firmware, software and/or any combinations thereof. In the implementation by hardware, the processor may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor or saved in the memory to be driven by the processor.

The present method addresses difficulties in applying effective FP algorithms for estimating candidates of transmitted symbol vectors arising from the discrete nature of the constellation by transforming the discrete constraint present in the known ML method for determining the Euclidian distance between the received signal's vector and the vectors of symbols of the constellation into a first function in a convex domain that presents significant low values for the vectors of symbols of the constellation. A minimum of the function in the convex domain can be found by applying known FP methods or algorithms that are more effective for finding a good estimate of a transmitted signal's vector than brute-force calculations. A second continuous function in the convex domain is added to the first function that penalizes estimation results with increasing distance from the received signal's vector.

While the invention has been described hereinbefore for detecting superimposed signals from transmitters that are all using the same constellation C it is also applicable to situations in which different transmitters use different constellations $C_T$, i.e., if the symbols of a constellation C are considered letters of an alphabet, each transmitter may use a different alphabet.

BRIEF DESCRIPTION OF THE DRAWINGS

The invention will be further explained with reference to the drawings in which

FIG. 3 shows an exemplary generalized block diagram of a transmitter and a receiver that communicate over a communication channel, FIG. 4 shows an exemplary flow diagram of method steps implementing embodiments of the present invention, FIG. 5 shows details of method steps of the present invention.

In the drawings identical or similar elements may be referenced by the same reference designators.

DETAILED DESCRIPTION

Figure 1:
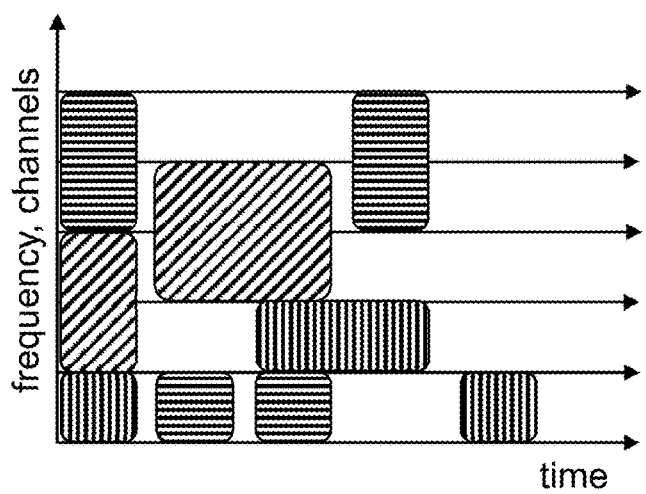
FIG. 1 shows a simplified schematic representation of orthogonal multiple access to a shared medium.
Figure 2A:
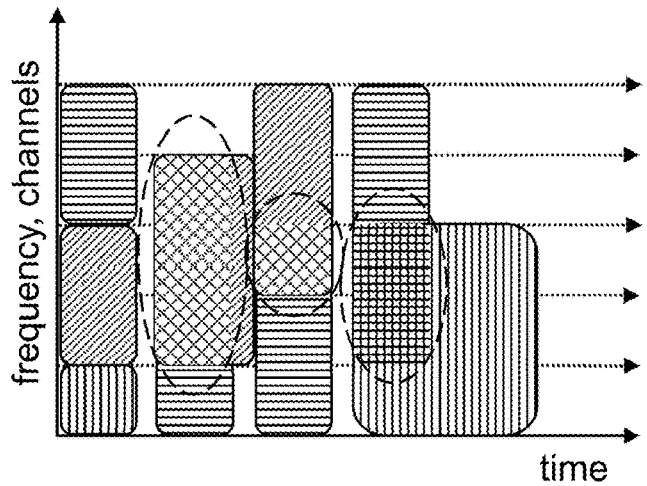
FIG. 2 shows a simplified schematic representation of non-orthogonal access to a shared medium.
Figure 2B:
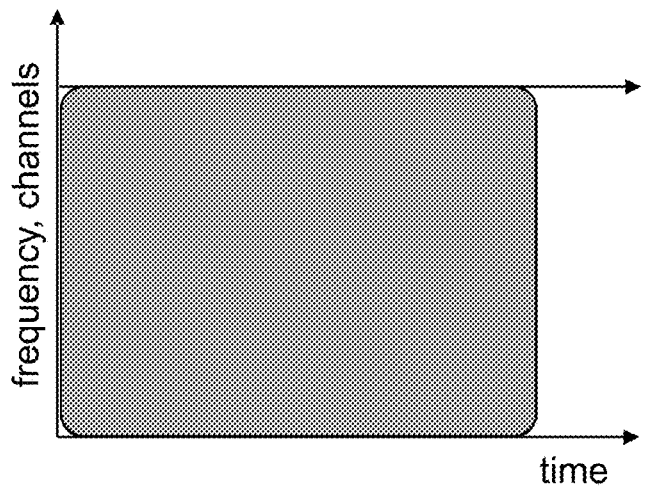

FIGS. 1 and 2 have been discussed further above and are not revisited here.

FIG. 3 shows an exemplary generalized block diagram of a transmitter T and a receiver R that communicate over a communication channel 208. Transmitter T may include, inter alia, a source 202 of digital data that is to be transmitted. Source 202 provides the bits of the digital data to an encoder 204, which forwards the data bits encoded into symbols to a modulator 206. Modulator 206 transmits the modulated data into the communication channel 208, e.g. via one or more antennas or any other kind of signal emitter (not shown). The modulation may for example be a Quadrature Amplitude Modulation (QAM), in which symbols to be transmitted are represented by an amplitude and a phase of a transmitted signal.

Channel 208 may be a wireless channel. However, the generalized block diagram is valid for any type of channel, wired or wireless. In the context of the present invention the medium is a shared medium, i.e., multiple transmitters and receivers access the same medium and, more particularly, the channel is shared by multiple transmitters and receivers.

Receiver R receives the signal through communication channel 208, e.g. via one or more antennas or any other kind of signal receiver (not shown). Communication channel 208 may have introduced noise to the transmitted signal, and amplitude and phase of the signal may have been distorted by the channel. The distortion may be compensated for by an equalizer provided in the receiver (not shown) that is controlled based upon channel characteristics that may be obtained, e.g., through analysing pilot symbols with known properties transmitted over the communication channel. Likewise, noise may be reduced or removed by a filter in the receiver (not shown). A signal detector 210 receives the signal from the channel and tries to estimate, from the received signal, which signal had been transmitted into the channel. Signal detector 210 forwards the estimated signal to a decoder 212 that decodes the estimated signal into an estimated symbol. If the decoding produces a symbol that could probably have been transmitted it is forwarded to a de-mapper 214, which outputs the bit estimates corresponding to the estimated transmit signal and the corresponding estimated symbol, e.g., to a microprocessor 216 for further processing. Otherwise, if the decoding does not produce a symbol that is likely to have been transmitted, the unsuccessful attempt to decode the estimated signal into a probable symbol is fed back to the signal detector for repeating the signal estimation with different parameters. The processing of the data in the modulator of the transmitter and of the demodulator in the receiver are complementary to each other.

While the transmitter T and receiver R of FIG. 3 appear generally known, the receiver R, and more particularly the signal detector 210 and decoder 212 of the receiver in accordance with the invention are adapted to execute the inventive method described hereinafter with reference to FIG. 4 and thus operate different than known signal detectors.

FIG. 4 shows an exemplary flow diagram of method steps implementing embodiments of the present invention. In step 102 a signal is received in an overloaded communication channel. The signal corresponds to a superposition of signals representing transmitted symbols selected from a constellation C of symbols $c_i$ and transmitted from one or more transmitters T. In step 104 a search space is defined in a convex domain including at least the components of the received signal vector y and of transmit symbol vectors s for all symbols $c_i$ of the constellation C. In step 106 a continuous first function $f_1$ is defined, which is a function of the received signal vector y and the channel characteristics H. The first function $f_1$ has a global minimum where the product of an input vector s from the search space and the channel matrix H equals the received signal vector y. Further, in step 108 a continuous second function $f_2$ is defined in the search space, which is a function of input vectors s from the search space. The second function $f_2$ has a significant low value for each of the transmit symbol vectors s of the symbols $c_i$ of the constellation C. It is to be noted that steps 104, 106 and 108 need not be executed in the sequence shown in the figure, but may also be executed more or less simultaneously, or in a different sequence. The first and second functions $f_1$, $f_2$ are combined to a third continuous function $f_3$ in step 110 through weighted adding. Once the third function $f_3$ is determined a fractional programming algorithm is applied thereto in step 112 that is targeted to finding an input vector ŝ that minimizes the third function $f_3$. The input vector ŝ that is the result output from the fractional programming algorithm is translated, in step 114, into an estimated transmit vector ŝc, in which every single component has a value from the list of possible values of corresponding components of transmit symbol vectors s of the symbols $c_i$ of the constellation C. The translation may include selecting the value from the list that is nearest to the estimated value. The estimated transmit vector ŝc is then output in step 116 to a decoder for decoding into an estimated transmitted symbol ŝc from the constellation C. The transmitted symbol ŝ may be further processed into one or more bits of the data that was transmitted, step 118.

FIG. 5 shows details of the method steps of the present invention executed for finding an input vector ŝ that minimizes the third function $f_3$, in particular the function according to equation 6 described further above. In step 112-1 the fractional programming is initialised with a start value for the estimated transmit signal's vector $ŝ_{start}$, and $β_{ij}$ is determined in step 112-2 for the start value of the estimated transmit vector $ŝ_{start}$. Then, a new candidate for ŝ is derived in step 112-3 by solving the equation for the value $β_{ij}$ determined in step 112-2. If the solution does not converge, "no"-branch of step 112-4, the value $β_{ij}$ is determined based on the new candidate ŝ derived in step 112-3 and the equation-solving process is repeated. If the solution converges, "yes"-branch of step 112-4, ŝ is forwarded to step 114 of FIG. 4, for mapping the estimated transmit vector ŝc whose components assume values from vectors s of symbols $c_i$ from the constellation C.

Figure 6:
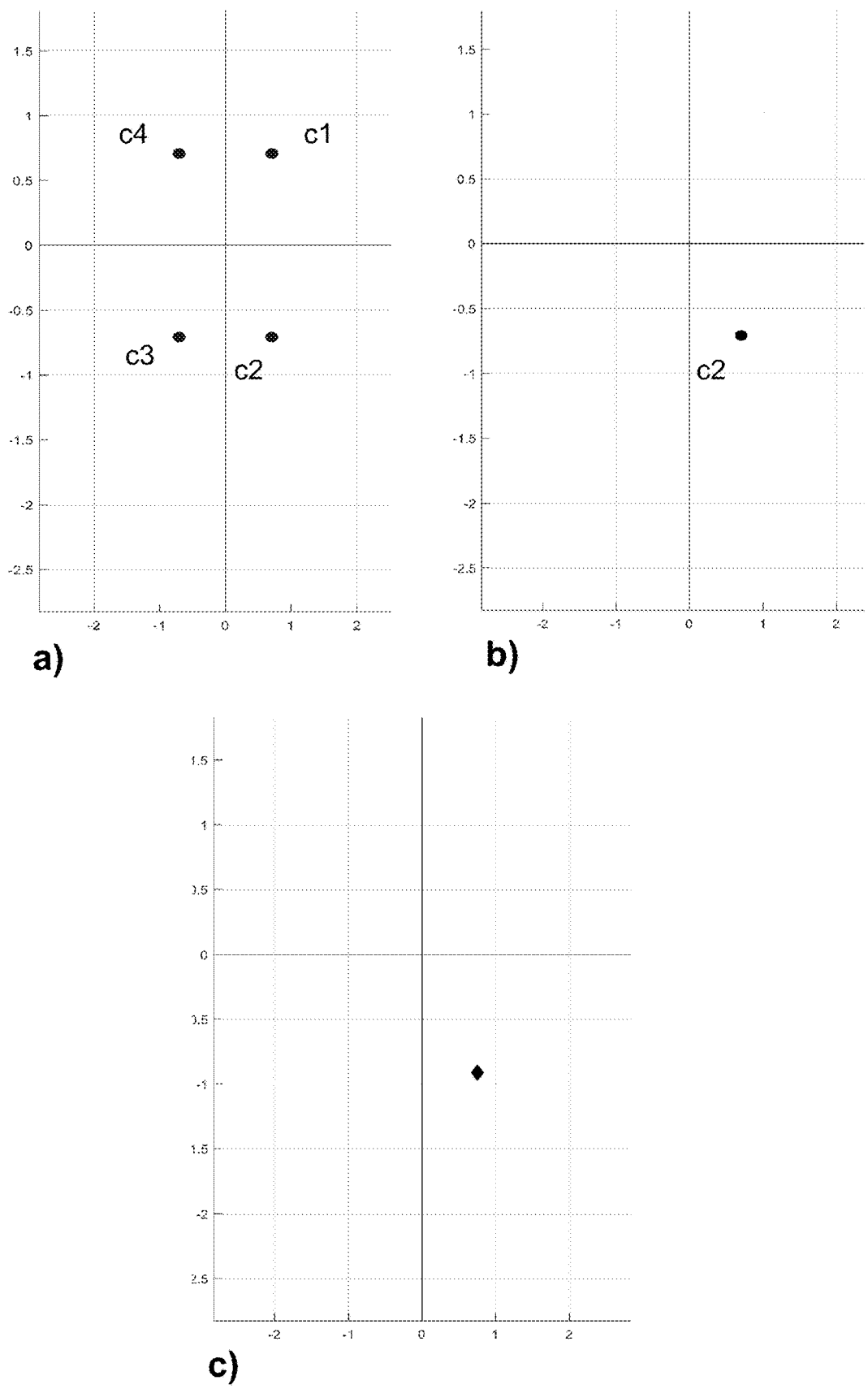
FIG. 6 shows exemplary and basic examples of a constellation, a transmitted and a received signal.

FIG. 6 *a*) shows exemplary and very basic examples of symbols c1, c2, c3 and c4 from a constellation C. The symbols c1, c2, c3 and c4 may represent symbols of a QAM-modulation. FIG. 6 *b*) shows a symbol that was actually transmitted over a channel, in this case symbol c2. FIG. 6 *c*) shows the signal that was actually received at a receiver. Due to some distortion and noise in the channel the received signal does not lie exactly at the amplitude and phase of symbol c2 that was sent. A maximum likelihood detector determines the distances between the received signal and each of the symbols from the constellation and would select that one as estimated symbol that is closest to the received signal. In the very simple example, this would be symbol c2. This process requires performing calculations for all discrete pairs of received signal and symbols from the constellation, and may result in a number of calculations that exponentially increases with the number of symbols in the constellation and the number of transmitters that possibly transmitted the signal.

Figure 7:
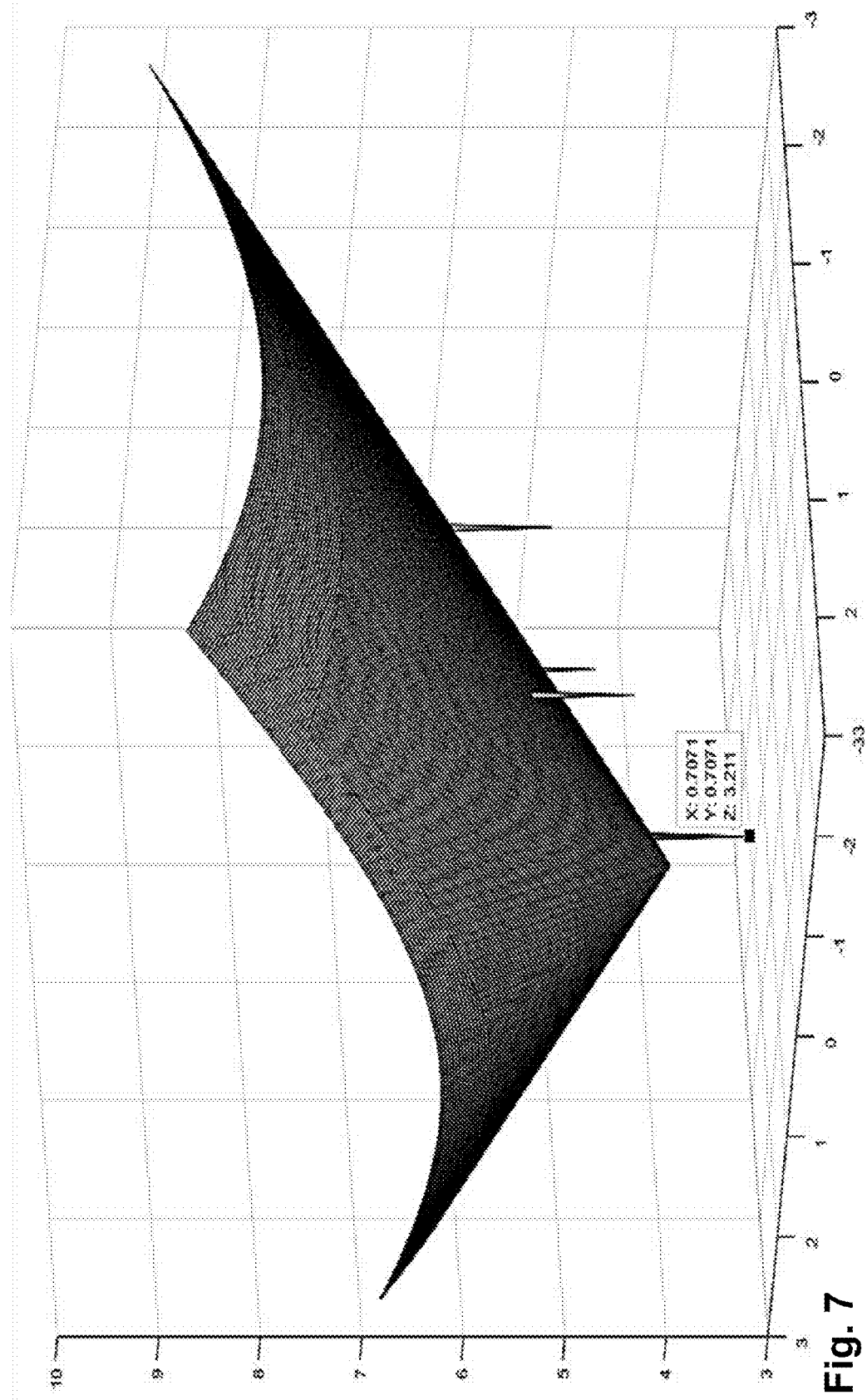
FIG. 7 shows a simplified exemplary graphical representation of the third function determined in accordance with the present invention, that can be effectively solved using fractional programming.

FIG. 7 shows a simplified exemplary graphical representation of the third function determined in accordance with the present invention that can be effectively solved using fractional programming. The graphical representation is based on the same constellation as presented in FIG. 6 a), and it is assumed that the same signal c2 was transmitted. The bottom surface of the three-dimensional space represents the convex search space for amplitudes and phases of signal vectors. The vertical dimension represents the values for the third function. Since the search space is convex, the third function has values for any combination of amplitude and phase, even though only 4 discrete symbols c1, c2, c3 and c4 are actually in the constellation. The surface having a shape of an inverted cone represents the results of the continuous first function over the convex search space, and has a global minimum at the location of the received signal. The 4 spikes protruding downwards from the cone-shaped surface represent the continuous second function that has significant low values at the phases and amplitudes of the symbols from the constellation. The first and second function have been combined into the third function, which is still continuous and which can now be subjected to a fractional programming algorithm for finding the amplitude and phase that minimizes the third function. It is to be borne in mind that this representation is extremely simplified, but it is believed to help understanding the invention.

The invention claimed is:

1. A computer-implemented method of estimating transmit symbol vectors transmitted in an overloaded communication channel that is characterized by a channel matrix of complex coefficients, the method including:
   receiving, in a receiver, a signal represented by a received signal vector, the received signal vector corresponding to a superposition of signals representing transmitted symbols selected from at least one constellation of symbols and transmitted from one or more transmitters,
   defining a search space in a convex domain including at least the components of the received signal vector and of transmit symbol vectors for all symbols of the at least one constellation,
   defining a continuous first function, which is a function of the received signal vector and the channel characteristics, the first function having a global minimum where the product of an input vector from the search space and the channel matrix equals the received signal vector,
   defining a continuous second function in the search space, which is a function of input vectors from the search space, the second function having a significant low value for each of the transmit symbol vectors of the symbols of the at least one constellation,
   combining the first function and the second function into a third function by weighted adding,
   applying a fractional programming algorithm to the third function, targeted to finding an input vector that minimizes the third function,
   applying a mapping rule that translates the input vector that minimizes the third function into an estimated transmit symbol vector, in which every single component has a value from a list of possible values of corresponding components of transmit symbol vectors of the symbols of the at least one constellation, and
   outputting the estimated transmit symbol vector to a decoder for decoding into an estimated transmitted symbol from the at least one constellation.

2. The method of claim 1, wherein the second function has a tuneable factor that determines the gradient of the second function in a vicinity of the significant low value at each of the transmit symbol vectors of the symbols of the at least one constellation.

3. The method of claim 2, wherein the tuneable factor is different for different symbols of the at least one constellation.

4. The method of claim 3, wherein applying the fractional programming algorithm includes:
   providing an initial estimated transmit symbol vector that is at least farther away from the received signal vector than a minimum distance between vectors of neighbouring symbols from the at least one constellation, or
   providing a null vector as an initial transmit symbol vector.

5. The method of claim 1, wherein the first function is monotonously increasing from the global minimum.

6. The method of claim 1, wherein the fractional programming algorithm is targeted to find a value of the third function that is lower than the global minimum of the first function.

7. The method of claim 1, wherein the first function is a Euclidian distance function centered around the received signal vector.

8. The method of claim 1, wherein the second function is a function based on or tightly approximating the $l_0$-norm.

9. A non-transitory computer-readable medium storing a computer program product comprising computer executable instructions, which, when executed on a computer, cause the computer to estimate transmit symbol vectors transmitted in an overloaded communication channel, which is characterized by a channel matrix of complex coefficients, by performing operations comprising:
   receiving, in a receiver, a signal represented by a received signal vector, the received signal vector corresponding to a superposition of signals representing transmitted symbols selected from at least one constellation of symbols and transmitted from one or more transmitters,
   defining a search space in a convex domain including at least the components of the received signal vector and of transmit symbol vectors for all symbols of the at least one constellation,
   defining a continuous first function, which is a function of the received signal vector and the channel characteristics, the first function having a global minimum where the product of an input vector from the search space and the channel matrix equals the received signal vector,
   defining a continuous second function in the search space, which is a function of input vectors from the search space, the second function having a significant low value for each of the transmit symbol vectors of the symbols of the at least one constellation,
   combining the first function and the second function into a third function by weighted adding,
   applying a fractional programming algorithm to the third function, targeted to finding an input vector that minimizes the third function, applying a mapping rule that translates the input vector that minimizes the third function into an estimated transmit symbol vector, in which every single component has a value from a list of possible values of corresponding components of transmit symbol vectors of the symbols of the at least one constellation, and outputting the estimated transmit symbol vector to a decoder for decoding into an estimated transmitted symbol from the at least one constellation.

10. The non-transitory computer-readable medium of claim 9, wherein the second function has a tuneable factor that determines the gradient of the second function in a vicinity of the significant low value at each of the transmit symbol vectors of the symbols of the at least one constellation.

11. The non-transitory computer-readable medium of claim 10, wherein the tuneable factor is different for different symbols of the at least one constellation.

12. The non-transitory computer-readable medium of claim 11, wherein applying the fractional programming algorithm includes:

providing an initial estimated transmit symbol vector that is at least farther away from the received signal vector than a minimum distance between vectors of neighbouring symbols from the at least one constellation, or providing a null vector as an initial transmit symbol vector.

13. The non-transitory computer-readable medium of claim 9, wherein the first function is monotonously increasing from the global minimum.

14. The non-transitory computer-readable medium of claim 9, wherein the fractional programming algorithm is targeted to find a value of the third function that is lower than the global minimum of the first function.

15. The non-transitory computer-readable medium of claim 9, wherein the first function is a Euclidian distance function centered around the received signal vector.

16. The non-transitory computer-readable medium of claim 9, wherein the second function is a function based on or tightly approximating the $l_0$-norm.

* * * * *